United States Patent Office 3,374,256
Patented Mar. 19, 1968

3,374,256
COMPLEX PHOSPHORUS SALTS
John S. Driscoll, Belmont, and Clifford N. Matthews, Winchester, Mass., assignors to Monsanto Research Corporation, St. Louis, Mo., a corporation of Delaware
No Drawing. Filed Aug. 16, 1963, Ser. No. 302,697
19 Claims. (Cl. 260—429.9)

This invention relates to the provision of new compounds, and more particularly, new organophosphorus compounds.

Certain novel mesomeric organophosphorus compounds in which two tri-substituted phosphorus atoms are attached to the same carbon atom have been provided as described in the application of Clifford N. Matthews, SN 154,874, filed Nov. 24, 1961, now abandoned. These compounds are designated phosphonium methylene phosphorane salts. They can be represented by a formula corresponding to the stated nomenclature, in which one P atom is doubly-bonded to the central carbon atom (phosphorane) and one is singly-bonded to it and charged (phosphonium), as follows:

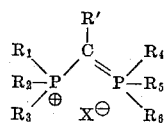

where each R (each of $R_1$, $R_2$, $R_3$, $R_4$, $R_5$ and $R_6$) is hydrocarbon free of aliphatic unsaturation and containing from 1 to 18 carbon atoms, R' is selected from the class consisting of H and hydrocarbon as defined for R, and X is an anion. Being mesomeric, the stated compounds are capable of resonance, which may be represented by the formulas:

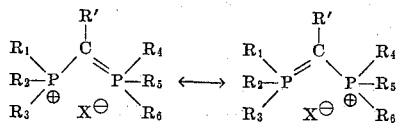

More accurately, the stated mesomeric compounds are represented by a formula showing the charge distributed between the two P atoms and showing the equivalence of the two P atoms, as follows:

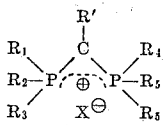

Preparation of the stated mesomeric compounds can be accomplished as disclosed in the stated application, by dehydrohalogenation of a methylene bis(phosphonium halide), for example as illustrated by the equation

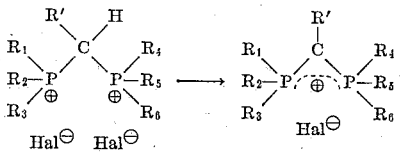

where each R is as defined above, R' is as defined above, and Hal⊖ is a halide ion. Other phosphonium methylenephosphorane salts, as further disclosed in the stated application, can be obtained from the halide by metathesis. This is illustrated, for example, by the preparation of triphenylphosphonium methylene triphenylphosphorane tetraphenylboronate, as illustrated by the equation

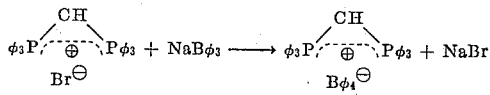

where φ represents phenyl.

It is an object of this invention to provide novel phosphonium methylene phosphorane salts and methods of preparing the same.

A further object is to provide novel phosphorus-containing addition compounds and methods for their preparation.

These and other objects will become evident upon consideration of the following specification and claims.

It has now been found that novel, valuable phosphorus compounds can be prepared from phosphonium methylene phosphorane salts and their precursors by various methods as further set forth hereinbelow.

Briefly, the present invention provides, as new compounds, (1) Phosphonium methylenephosphorane trihalides,
(2) Phosphonium methylenephosphorane metal polyhalides,
(3) Methylenediphosphonium tetrahalides, and
(4) Methylenediphosphonium metal polyhalides.

Novel and unexpected methods provided hereby include addition of halogen compounds selected from (1) Halogens, and
(2) Metal halides to phosphorus compounds selected from (1) Phosphonium methylenephosphorane halides, and
(2) Methylene bis(phosphonium halides).

The new methods of the invention also include reactions of elemental metals with certain phosphorus-containing materials selected from (1) Methylene bis(phosphonium halides), and
(2) Hydrocarbyl polyhalide/tri-substituted phosphine mixtures.

Proceeding now to consider these several embodiments of the present invention individually, and considering first the formation of phosphonium methylenephosphorane derivatives from phosphonium methylenephosphorane halides, it has been found that instead of undergoing metathesis with halogens and with certain metal halides, the mesomeric phosphonium methylenephosphorane salts form addition compounds, as represented by the equations (1) $R'C[P(R)_3]_2X + (X)_2 \rightarrow R'C[P(R)_3]_2(X)_3$ and (2) $R'C[P(R)_3]_2X + M(X)_a \rightarrow R'C[P(R)_3]_2M(X)_{(a+1)}$ where each R is a hydrocarbon radical, R' is selected from the group consisting of H and hydrocarbon radicals, each X is a halogen atom, M is a metal which forms halides having bonds of predominantly covalent character, and $a$ is the valence of said metal, wherein said hydrocarbon radicals are free of aliphatic unsaturation and contain up to 18 carbon atoms. The metal halides having a predominantly covalent bond character are those wherein the character of the bond, calculated using the electronegativity scale given on p. 93 and as discussed on pp. 97–102 of Linus Pauling's "Nature of the Chemical Bond," 3rd ed. (Cornell Univ. Press, 1960), is less than one-half ionic. It is to be understood that in the above formulas, each X may be the same or different, and each R may be the same or different: thus, $R'C[P(R)_3]_2X$ is the equivalent of the formula

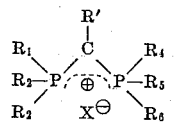

where each R (each of $R_1$, $R_2$ and so forth) and R' are as defined above, and X is a halogen atom.

It has further been discovered that the metal polyhalide compounds provided by the method of Equation 2 above can be made by other reactions than the one shown above. This is illustrated in the following equations:

(3) $2(R)_3P + R'CH(X)_2 + M \rightarrow R'C[P(R)_3]_2M(X)_{(a+)}$
(4) $R'CH[P(R)_3]_2(X)_2 + M \rightarrow R'C[P(R)_3]_2M(X)_{(a+1)}$ in which R, R', X, M and a are as defined above.

In connection with the stated reactions, it is of interest to note that the organic reactants are successive precursors of phosphonium methylenephosphorane halides:

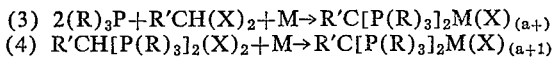

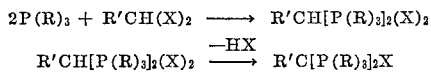

In addition to the above-described phosphonium methylenephosphorane perhalides and metal halides, a further series of well-defined salts are provided by this invention, which are prepared by addition of a methylene bis(phosphonium halide) to a halogen or a metal halide. It has now been found that these reactants also undergo an addition reaction. The products formed are the 1:1 molar ratio adducts. This is illustrated by the equations $(R')_2C[P(R)_3]_2(X)_2 + X_2 \rightarrow (R')_2C[P(R)_3]_2(X)_4$
$(R')_2C[P(R)_3]_2(X)_2 + M(X)_a \rightarrow$
$\qquad\qquad\qquad\qquad (R')_2C[P(R)_3]_2M(X)_{(a+2)}$ In the description of the present invention, it will be noted that the products are represented by linear formulas. The exact structures of these novel materials are uncertain. For example, triphenylphosphonium methylenetriphenylphosphorane iron tetrachloride could have a structure in which each cation is associated separately with halogen anions, or one involving the tetrachloroferrate anion:

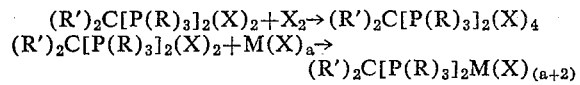

or

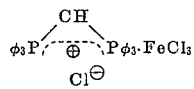

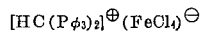

($\phi$=phenyl) and the actual distribution of the charge is as yet unknown. It is to be understood that the nomenclature used herein is intended to cover either possibility. In any event, the elemental analysis of the compounds corresponds to the above-stated formulas, and a variety of these novel materials have been established to be well-defined crystalline substances with sharp melting points.

The presently provided compounds are useful for a wide variety of industrial and agricultural purposes. The present compounds exhibit toxicant activity, and may be employed in this connection for combating pests, as insecticides, fungicides, herbicides, nematocides, bactericides; specifically as soap bacteriostats and industrial preservatives, and so forth. The compounds, and particularly the triiodides, have especially unusual activity as defoliants. The metal halide compounds are generally stable, frequently are deeply colored materials, and, particularly the phosphonium methylenephosphorane metal polyhalides, are soluble in organic solvents. They can be employed, for example, to provide stable and soluble metal compounds: thus, whereas FeCl$_3$ is hygroscopic, presently provided soluble adducts of this metal salt are not. Exemplary of useful applications for the metal salt compounds of the invention are as catalysts for polymerizations of vinyl compounds and for Friedel-Crafts reactions, and as additives for fuels and oils, particularly to enhance the combustion properties of fuels and the lubricating properties (load-carrying ability, wear resistance, oxidation resistance, and so forth) of oils. Those which are colored may be used as dyes or pigments. Still further applications for the present novel compounds include use as wetting agents, rubber antidegradation agents, chemical intermediates, and so forth. The methods of the invention may be used to isolate the stated compounds, and also as a method of scavenging metallic substances, by association with an oil or the like susceptible to undesired contamination with metals or metal halides, and so forth.

Proceeding now to a consideration of the novel products provided by this invention, and considering first the phosphonium methylenephosphorane trihalides, these are illustrated, for example, by triphenylphosphonium methylene-triphenylphosphorane triiodide,
triphenylphosphonium methylenetriphenylphosphorane tribromide,
triphenylphosphonium methylenetriphenylphosphorane trichloride,
triphenylphosphonium methylenetriphenylphosphorane chloride fluoride iodide,
tri-p-tolylphosphonium methylenetri-p-tolylphosphorane triiodide,
triphenylphosphonium methylenetriphenylphosphorane bromide dichloride,
triphenylphosphonium ethylidenetriphenyl-phosphorane triiodide,
tributylphosphonium methylenetributyl-phosphorane triiodide,
tribenzylphosphonium methylenetribenzyl-phosphorane trichloride,
tricyclohexylphosphonium benzylidene-tricyclohexyl-phosphorane triiodide,
trinaphthylphosphonium methylenetrinaphthyl-phosphorane triiodide,
trimethylphosphonium methylenetrimethylphosphorane tribromide,
tris(butylphenyl)-phosphonium methylenetris(butylphenyl)phosphorane triiodide,
triphenylphosphonium propylidenetriphenylphosphorane triiodide,
and so forth.

The methylene diphosphonium tetrahalides provided by the invention are illustrated, for example, by
methylene bis(triphenylphosphonium) tetrachloride,
methylene bis(triphenylphosphonium) tetrabromide,
methylene bis (triphenylphosphonium) tetraiodide,
methylene bis(tri-p-tolylphosphonium) tetrachloride,
methylene bis (tributylphosphonium) bromide trichloride,
benzylidene bis(triphenylphosphonium) tetrabromide,
methylene bis(tricyclohexylphosphonium) tetrabromide,
methylene bis(triphenylphosphonium) fluoride triiodide,
methylene bis(trinaphthylphosphonium) tetrachloride,
methylene bis(tripentylphosphonium) tetrabromide,
methylene bis(triphenylphosphonium) diiodide dibromide,
ethylidene bis(tri-2,4-xylylphosphonium) dibromide dichloride,
octylidene bis(triphenylphosphonium) tetraiodide,
methylene bis(tridecyl-phosphonium) tetrabromide,
methylene bis(tribenzylphosphonium) tetrabromide,
methylene bis(butyldiphenylphosphonium) tetraiodide,
methylene triphenylphosphonium tributylphosphonium tetrabromide,
methylene bis(triethylphosphonium) trichloride fluoride,
methylene bis(triphenylphosphonium) dibromide dichloride,
benzylidene bis(triphenylphosphonium) tetraiodide,
methylene bis(tributylphosphonium) dibromide dichloride,
methylene bis(tri-o-tolylphosphonium) tetraiodide,
cyclohexylidene bis(triphenylphosphonium) tetrabromide,
and so forth.

Proceeding now to a consideration of the novel metal salts provided by this invention, and considering first the phosphonium methylene phosphorane metal halides, these are illustrated, for example, by triphenylphosphonium methylenetriphenylphosphorane copper dichloride,
triphenylphosphonium methylenetriphenylphosphorane copper bromide chloride,
triphenylphosphonium methylenetriphenylphosphorane copper trichloride,
triphenylphosphonium methylenetriphenylphosphorane copper tribromide,
triphenylphosphonium methylenetriphenylphosphorane copper bromide chloride fluoride,
triphenylphosphonium methylenetriphenylphosphorane copper diiodide,
tri-p-tolylphosphonium methylenetriphenylphosphorane copper dichloride,
tri-p-tolylphosphonium methylenetriphenylphosphorane gold dichloride,
tri-p-tolylphosphonium methylenetri-p-tolylphosphorane gold dibromide dichloride,
triphenylphosphonium ethylidenetriphenylphosphorane copper dichloride,
trimethylphosphonium methylenetrimethylphosphorane copper dibromide,
tributylphosphonium methylenetributylphosphorane copper tribromide,
tributylphosphonium methylenetributylphosphorane zinc tribromide,
tricyclohexylphosphonium methylenetricyclohexylphosphorane zinc trichloride,
tribenzylphosphonium methylenetribenzylphosphorane zinc dibromide chloride,
triphenylphosphonium propylidenetriphenylphosphorane zinc tribromide,
triphenylphosphonium propylidenetriphenylphosphorane cadmium tribromide,
triphenylphosphonium benzylidenetriphenylphosphorane cadmium tribromide,
trinaphthylphosphonium methylenetrinaphthylphosphorane mercury tribromide,
tribiphenylylphosphonium methylenetribiphenylylphosphorane zinc difluoride iodide,
triphenylphosphonium methylenetriphenylphosphorane indium tetrabromide,
triphenylphosphonium methylenetriphenylphosphorane indium tetrachloride,
triphenylphosphonium methylenetriphenylphosphorane gallium tetrachloride,
tri-p-tolylphosphonium methylenetriphenylphosphorane indium tetraiodide,
tri-p-tolylphosphonium methylenetri-p-tolylphosphorane gallium tetrabromide,
triphenylphosphonium ethylidenetriphenylphosphorane indium bromide trifluoride,
tributylphosphonium methylenetributylphosphorane indium bromide triiodide,
tributylphosphonium methylenetributylphosphorane tin tribromide,
tricyclohexylphosphonium methylenetricyclohexylphosphorane tin tribromide,
tribenzylphosphonium methylenetribenzylphosphorane lead trichloride,
triphenylphosphonium propylidenetriphenylphosphorane tin trichloride,
triphenylphosphonium propylidenetriphenylphosphorane lead tribromide,
triphenylphosphonium benzylidenetriphenylphosphorane tin dibromide chloride,
tribiphenylylphosphonium methylenetribiphenylylphosphorane lead bromide diiodide,
triphenylphosphonium methylenetriphenylphosphorane niobium hexabromide,
triphenylphosphonium methylenetriphenylphosphorane niobium hexachloride,
triphenylphosphonium methylenetriphenylphosphorane niobium bromide pentachloride,
triphenylphosphonium methylenetriphenylphosphorane antimony tetrabromide,
triphenylphosphonium methylenetriphenylphosphorane antimony hexabromide,
tri-p-tolylphosphonium methylenetriphenylphosphorane antimony bromide pentafluoride,
tri-p-tolylphosphonium methylenetri-p-tolylphosphorane antimony tribromide iodide,
triphenylphosphonium ethylidenetriphenylphosphorane bismuth tetrabromide,
tris(decylphenyl)phosphonium methylenetris(decylphenyl)phosphorane bismuth iodide trifluoride,
tributylphosphonium methylenetributylphosphorane antimony tetrachloride,
tributyl phosphonium methylenetributylphosphorane antimony tetrabromide,
tricyclohexylphosphonium methylenetricyclohexylphosphorane antimony hexafluoride,
triphenylphosphonium methylenetriphenylphosphorane manganese tribromide,
triphenylphosphonium methylenetriphenylphosphorane manganese trichloride,
triphenylphosphonium benzylidenetriphenylphosphorane manganese triiodide,
triphenylphosphonium methylenetriphenylphosphorane iron tetrabromide,
triphenylphosphonium methylenetriphenylphosphorane iron dibromide dichloride,
triphenylphosphonium methylenetriphenylphosphorane iron tetrachloride,
tri-p-tolylphosphonium methylenetriphenylphosphorane iron iodide trichloride,
tri-p-tolylphosphonium methylenetriphenylphosphorane cobalt tribromide,
tri-p-tolylphosphonium methylenetri-p-tolylphosphorane cobalt bromide dichloride,
tri-p-tolylphosphonium methylenetri-p-tolylphosphorane cobalt bromide difluoride,
triphenylphosphonium ethylidenetriphenylphosphorane nickel tribromide,
triphenylphosphonium methylenetriphenylphosphorane nickel bromide dichloride,
trimethylphosphonium methylenetrimethylphosphorane iron tetrabromide,
tris(butylphenyl)phosphonium methylenetris(butylphenyl)phosphorane iron tetrachloride,
tributylphosphonium methylenetributylphosphorane iron bromide trichloride,
tributylphosphonium methylenetributylphosphorane cobalt bromide dichloride,
tributylphosphonium methylenetributylphosphorane cobalt tribromide,
tributylphosphonium methylenetributylphosphorane iron tetrabromide,
tricyclohexylphosphonium methylenetricyclohexylphosphorane iron tetrabromide,
tribenzylphosphonium methylenetribenzylphosphorane iron iodide trichloride,
trinaphthylphosphonium methylenetrinaphthlphosphorane iron tetrabromide,
tribiphenylylphosphonium methylenetribiphenylylphosphorane cobalt bromide dichloride,
and so forth.

Compounds illustrative of the methylene diphosphonium metal halide products of this invention include, for example methylene bis(triphenylphosphonium) copper tribromide,
methylene bis(triphenylphosphonium) copper tetrabromide,
methylene bis(tri-p-tolylphosphonium) copper tetrachloride,
methylene bis(tributylphosphonium gold bromide dichloride, benzylidene bis(triphenylphosphonium) zinc tetrabromide,
methylene bis(tricyclohexylphosphonium) cadmium tetrabromide,
methylene bis(triphenylphosphonium) mercury tetraiodide,
methylene bis(trinaphthylphosphonium) lanthanum pentachloride,
ethylidene bis(tri-2,4-xylylphosphonium) tin dibromide dichloride,
methylene bis(triphenylphosphonium) lead tetrachloride,
octylidene bis(triphenylphosphonium) rhenium pentaiodide,
methylene bis(tridecylphosphonium) antimony pentabromide,
methylene bis(triphenylphosphonium) antimony pentachloride,
methylene bis(tribenzylphosphonium) bismuth pentabromide,
methylene bis(butyldiphenylphosphonium) indium pentaiodide,
methylene triphenylphosphonium tributylphosphonium indium pentabromide,
methylene bis(triethylphosphonium) zinc tetrabromide,
methylene bis(triphenylphosphonium) arsenic pentabromide,
benzylidene bis(triphenylphosphonium) manganese tetraiodide,
methylene bis(tributylphosphonium) iron dibromide trichloride,
methylene bis(triphenylphosphonium) iron pentabromide,
methylene bis(tri-o-tolylphosphonium) iron pentaiodide,
methylene bis(triphenylphosphonium) iron pentaiodide,
cyclohexylidene bis(triphenylphosphonium) iron pentabromide,
methylene bis(triphenylphosphonium) cobalt tetrabromide,
and so forth.

Referring now to preparation of the presently provided novel salts, the methylene bis(phosphonium halide) compounds presently useful as starting materials are of the fomula $$(R')_2C[P(R)_3]_2(X)_2$$

where each R is hydrocarbon free of aliphatic unsaturation and containing from 1 to 18 carbon atoms, each R' is a radical selected from the group consisting of hydrogen and hydrocarbon radicals free of aliphatic unsaturation and containing from 1 to 18 carbon atoms, and each X is a halogen ion. Each R, each R' and each X may be the same or different. Thus, exemplary of such methylene bis(phosphonium halides) are methylene bis(triphenylphosphonium bromide),
methylene bis(triphenylphosphonium chloride),
methylene bis(triphenylphosphonium iodide),
methylene bis(triphenylphosphonium) bromide chloride,
methylene bis(triphenylphosphonium) bromide fluoride,
methylene bis(tri-p-tolylphosphonium bromide),
methylene bis(tri-p-tolylphosphonium chloride),
methylene bis(trixylylphosphonium bromide),
methylene bis(tri-n-butylphenylphosphonium bromide),
methylene bis(trioctadecylphosphonium) bromide chloride,
ethylidene bis(triethylphosphonium bromide),
benzylidene bis(triisobutylphosphonium fluoride),
octylidene bis(tribiphenylphosphonium bromide),
butylidene bis(tribenzylphosphonium bromide),
phenylmethylene bis(triphenylphosphonium chloride),
propylidene bis(tributylphosphonium chloride),
cyclohexylidene bis(triphenylphosphonium chloride),
methylene bis(trimethylphosphonium bromide),
methylene bis(diethylphenylphosphonium bromide),
naphthylxylylmethylene bis(triphenylphosphonium bromide),
methylene bis(tricyclohexylphosphonium iodide),
methylene bis(tris[octylnaphthyl]phosphonium bromide),
methylene triphenylphosphonium tributylphosphonium dibromide,
and so forth.

Tri-substituted phosphonium methylene tri-substituted phosphorane halides useful in preparing the tri-halides and metal halide compounds of this invention are of the formula

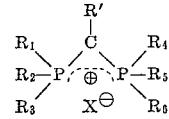

or, more concisely, $R'C[P(R)_3]_2X$ where each R (each of $R_1$, $R_2$, $R_3$ and so forth), R' and X are as defined above with reference to the methylene bis(phosphonium halide) formula. Illustrative of these materials are triphenylphosphonium methylenetriphenylphosphorane bromide,
triphenylphosphonium methylenetriphenylphosphorane chloride,
triphenylphosphonium methylenetriphenylphosphorane iodide,
tri-p-tolylphosphonium methylenetri-p-tolylphosphorane bromide,
tri-p-tolylphosphonium methylenetri-p-tolylphosphorane fluoride,
triphenylphosphonium ethylidenetriphenylphosphorane bromide,
trimethylphosphonium methylenetrimethylphosphorane chloride,
tributylphosphonium methylenetributylphosphorane bromide,
tributylphosphonium methylenetributylphosphorane iodide,
tricyclohexylphosphonium methylenetricyclohexylphosphorane bromide,
tribenzylphosphonium methylenetribenzylphosphorane bromide,
dibenzylphenylphosphonium methylenedibenzylphenylphosphorane iodide,
triphenylphosphonium propylidenetriphenylphosphorane bromide,
triphenylphosphonium octadecylidenetriphenylphosphorane chloride,
triphenylphosphonium benzylidenetriphenylphosphorane bromide,
trinaphthylphosphonium methylenetrinaphthylphosphorane bromide,
tribiphenylylphosphonium methylenetribiphenylylphosphorane iodide,
and so forth.

As noted above, reaction mixtures including a tri-substituted phosphine and a hydrocarbyl polyhalide react with metals to form the phosphonium methylenephosphorane metal halides.

Useful phosphine starting materials are trihydrocarbyl phosphines where each hydrocarbyl radical is a hydrocarbon radical containing up to 18 carbon atoms and free of aliphatic unsaturation, such as triphenylphosphine, tri-p-tolylphosphine, trixlylphosphine, tris(p-butylphenyl) phosphine, trinaphthylphosphine, tribiphenylylphosphine, triphenethylphosphine, tributylphosphine, triethylphosphine, ethyldiphenylphosphine, and so forth.

The halogen-containing reactants are hydrocarbyl polyhalides of the formula $(R')_{(4-b)}C(X)_b$ where each R' is selected from the class consisting of H and hydrocarbon free of aliphatic unsaturation containing up to 18 carbon atoms, each X is halogen, $b$ is an integer of from 2 to 3, and at least one R' is H when b is 2. Haloalkanes are preferred. Exemplary of these hydrocarbyl polyhalides are methylene dibromide, methylene dichloride, methylene diiodide, bromochloromethane, bromodichloromethane, dibromochloromethane, bromoform, 1,1-dibromoethane, 1,1-dibromopropane, α,α-dibromotoluene and the like.

Metals useful in preparation of the phosphorus-containing metal halide compounds of the invention are metals above hydrogen in the electromotive series (oxidation potentials larger than that of hydrogen—page 1733, Handbook of Chemistry and Physics, 41st ed, Chem. Rubber Pub. Co., 1959), which form halides having a bond predominantly covalent in character, such as iron, zinc, aluminum, manganese, lead, cadmium, cobalt and so forth.

In practicing the methods of the invention wherein a metal halide is reacted with a phosphorus compound to form the presently provided compounds, useful metal halides are those having a bond character that is predominantly covalent, rather than ionic, calculated using Pauling's electronegativity values, as explained above. The halides of the alkali metals, which have a bond character that is more than 50% ionic, produce metathesis, it is found. On the other hand, a metal halide in which the bond character is more covalent than ionic produces addition compounds as described above. Thus, the exemplary useful metal halides are $AlBr_3$, $AlCl_3$, $AlF_3$, $SbBr_3$, $SbCl_3$, $SbF_3$, $SbF_5$, $SbI_3$, $SbI_5$, $AsBr_3$, $AsCl_3$, $AsF_3$, $AsI_3$, $BeBr_2$, $BeCl_2$, $BeF_2$, $BeI_2$, $BiBr_3$, $BiCl_3$, $BiF_3$, $BiI_3$, $CdBr_2$, $CdCl_2$, $CdF_2$, $CdI_2$, $CeCl_3$, $CoBr_2$, $CoCl_2$, $CoI_2$, $CuBr$, $CuBr_2$, $CuCl$, $CuCl_2$, $CuI$, $GaBr_3$, $GaCl_3$, $GaI_3$, $AuBr$, $AuBr_3$, $AuCl$, $AuCl_3$, $AuI_3$, $InBr_3$, $InCl_3$, $InI_3$, $FeBr_2$, $FeBr_3$, $FeCl_2$, $FeCl_3$, $FeF_3$, $FeI_2$, $LaBr_3$, $LaCl_3$, $LaI_3$, $PbBr_2$, $PbCl_2$, $PbI_2$, $MnBr_3$, $MnCl_2$, $MnI_2$, $HgBr_2$, $HgBrI$, $HgCl_2$, $HgF_2$, $HgI_2$, $NbBr_5$, $NbCl_5$, $NbF_5$, $NiBr_2$, $NiCl_2$, $NiI_2$, $OsF_6$, $ReCl_3$, $ReCl_6$, $SeF_4$, $AgBr$, $AgCl$, $AgF$, $AgF_2$, $AgI$, $TaF_5$, $TlBr_3$, $TlCl_3$, $TlF_3$, $SnBr_2$, $SnCl_2$, $ZnBr_2$, $ZnCl_2$, $ZnF_2$, and so forth.

Referring to perhalide preparation, the halogens including $I_2$, $Br_2$ and $Cl_2$ may be used, and also interhalogens such as $BrCl$, $ClF$, $IBr$, $ICl$, and the like.

Proceeding now to consider the several methods of forming the presently provided new compounds in accordance with this invention, as stated above, these include preparation of the compounds (1) Phosphonium methylenephosphorane trihalides,
(2) Phosphonium methylenephosphorane metal halides,
(3) Methylene diphosphonium tetrahalides, and
(4) Methylene diphosphonium metal halides by addition of halogen compounds selected from (1) Halogens, and
(2) Metal halides to phosphorus compounds selected from (1) Phosphonium methylene phosphorane halides, and
(2) Methylene bis(phosphonium halides), and by reactions of elemental metals with certain phosphorus compounds including (1) Methylene bis(phosphonium halides), and
(2) Hydrocarbyl polyhalide/trisubstituted phosphine mixtures.

In most cases, simply contacting the reactants, generally in an organic solvent, under such mild conditions as room temperature (about 25–30° C.) and atmospheric pressure, is sufficient to produce the new compounds. Surprisingly, even the reaction of an elemental metal with the phosphorus compounds proceeds under such mild conditions: for example, contacting a methylene bis(phosphonium halide) solution with iron at 25–50° C. (see Example 17) forms the phosphonium methylene phosphorane iron tetrahalide. On the other hand, the synthesis may also be carried out at more elevated temperatures and pressures: for example, the iron salt is produced by heating triphenylphosphine with methylene dichloride in a closed, unlined, iron alloy bomb at 160° C. (see Example 20). Similar variation in reaction conditions is effective in other methods producing the novel products of this invention.

Generally, in conducting the reactions, temperatures used may vary from down to where the reaction mixture is barely liquid up to any temperature below the decomposition temperature of the mixture components. The rapidity of the reaction will vary with the reactants chosen. In some cases the reaction may be exothermic and require cooling, diluents or the like to moderate its violence. Other pairs of reactants may not react completely until after refluxing at elevated temperatures. Suitable temperatures for carrying out the reaction are usually between 0° and 200° C. and in most cases, in the range of 25–100° C. Pressure variation may also be utilized to facilitate conducting the reaction, for example by carrying out the reaction in a pressure-resistant vessel under autogenous pressure and at elevated temperatures. The time required to accomplish the reaction depends on functional factors such as reactivity of the reactants, the temperature of reaction, and so forth. Anhydrous conditions during the reaction are sometimes advantageous, but not always essential. Batch or continuous methods may be used, and on completion of the reaction, the products may be separated by methods such as precipitation, evaporation, distillation, extraction and the like.

The reactants are generally contacted in the presence of an organic solvent or diluent. Preferably this will be a solvent for one or more of the reactants and reaction product: as will appear hereinafter, progress of the presently considered reactions in many cases can be followed by observing the dissolution of a reactant or the precipitation of the reaction product. A wide variety of organic solvents and diluents may be employed in carrying out the presently provided methods, including hydroxylic compounds such as alkyl alcohols like methyl, ethyl and propyl alcohol; ethers such as diethyl ether, dioxane, tetrahydrofuran, and diglyme; hydrocarbons such as benzene and hexane; haloalkanes such as methylene dichloride, methylene dibromide, chloroform, dibromochloromethane, bromodichloromethane, and ethylene dichloride; halogenated cyclic compounds such as dichlorobenzene; polar solvents such as acetonitrile, dimethylformamide, dimethylsulfoxide, and so forth. Generally the solvents and diluents used will be inert, but this is not necessary; haloalkanes, which may participate in the present reactions by halogen exchange, are often useful. Especially where a reactant is itself a liquid at reaction temperatures, the solvent or diluent can be omitted entirely.

Referring more specifically to the several methods stated above, preparation of the phosphonium methylenephosphorane trihalides and methylene diphosphonium tetrahalides is accomplished by contacting the appropriate phosphorus halide with a halogen, suitably in solution. To isolate the product, the solvent is driven off, providing a residue of the desired product, generally as a solid. Preferably the halogen and the phosphonium halide compound are contacted in about a 1:1 molar ratio; the ratio can sometimes vary, say from a 10:1 to a 1:10 molar ratio of phosphorus halide compound to halogen, in which case means to purify the product by removing unreacted starting material, such as extraction, may be employed.

In the reaction of metal halides with phosphonium methylene phosphorane halides, contacting the reactants in a solvent for the phosphorus compound is convenient. In general, the solubility of the metal salts in such solvents is slight, and the course of the reaction can be followed by observation of the gradual dissolution of the metal salt as it is converted by reaction with the phosphorus compound to the soluble reaction product. The ratio of the reactants is suitably a 1:1 molar ratio, but can vary to provide up to, say, 10 moles of one to 1 mole of the other, if desired. Unreacted starting material such as undissolved metal salt will be removed by filtration, for example, and the product conveniently isolated by evaporation to remove the solvent, precipitation or the like.

In the reaction of a methylene bis(phosphonium halide) with a metal halide to form the methylene diphosphonium metal polyhalide products of this invention, similarly, contacting the reactants in an organic solvent is convenient. With these systems, the product generally separates as a precipitate, recoverable by filtration. The reactants are preferably contacted in a 1:1 molar ratio. The methylene bis(phosphonium halide) molar ratio to the metal halide may range, if desired, from, say, 10:1 to 1:10. Unreacted phosphorus compound, if it is present, is conveniently removed in the solvent medium by filtering it off from the precipitated product. The initial precipitate produced with an excess of metal salt can, it has been observed, readily be converted by a single recrystallization to the substantially pure 1:1 molar ratio compound.

The reaction of a methylene bis(phosphonium halide) with an elemental metal to form the phosphonium methylene phosphorane metal polyhalide is also carried out by contacting the reactants in the presence of an organic solvent for the phosphorus compound, such as methylene dichloride or methanol. If the solvent is a halogenated compound like methylene dichloride, it can apparently participate in the reaction, providing part of the halogen ions satisfying the valence of the metal:

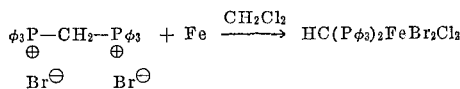

The metal goes into solution as the reaction proceeds, and the ratios of the phosphorus compound and metal are not critical: undissolved solid metal is readily removed where the purpose is isolation of the product, or an excess of the phosphorus compound may be used to scavenge a solution exposed to contamination by metals. Generally the products are partially or completely soluble in the organic solvent reaction medium, and can be isolated as a solid residue on driving off the solvent; further purification may be accomplished by usual means such as extraction, recrystallization and the like.

Each of the above-discussed reactions proceeds at useful rates at relatively low temperatures, and is conveniently conducted at temperatures in the range of 20° to 100°.

Reaction of a trisubstituted phosphine and hydrocarbyl polyhalide mixture with a metal generally requires heating to produce appreciable yields of the phosphonium methylene phosphorane metal halides in reasonable times, such as heating at between 100° and 200° C. When the halogen compound is volatile at such temperatures, the reaction mixture is suitably heated in a closed container under autogenous pressure to avoid loss of reactant materials. Large departures can be made from the ratios of 2 moles of trisubstituted phosphine and one of the haloalkane residue to one gram-atom of metal in the final products: for example, a large excess of the dihalomethane is suitably employed, to provide a solvent medium for the reaction, and the metal may also be present in great excess of that consumed in the reaction, though this is not essential. The product is isolated by means such as evaporation, extraction, recrystallization and the like.

The invention is illustrated but not limited by the following examples.

*Examples 1–16*

These examples illustrate formation of metal-containing mesomeric phosphorus compounds in accordance with the equation

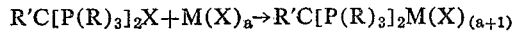

Examples 1–3 illustrate formation of a cuprous salt, in accordance with the equation

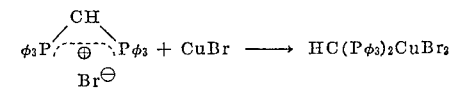

($\phi$=phenyl throughout the examples)

(1) A mixture of 0.46 grams (g.) of cuprous bromide and 2.0 g. of triphenylphosphonium methylenetriphenylphosphorane bromide in 100 milliliters (ml.) of methylene dichloride is stirred for an hour at room temperature. The cuprous bromide gradually dissolves, providing a very light yellow solution. Flash evaporation of the solution provides 2.36 g. of triphenylphosphonium methylenetriphenylphosphorane copper dibromide as a white solid melting at 195–198° (° C. throughout).

(2) A mixture of 0.23 g. of cuprous bromide and 1.0 g. of triphenylphosphonium methylenetriphenylphosphorane bromide in 25 ml. of methylene dichloride is refluxed for 5 hours, during which time the salt slowly goes into solution. The reaction mixture is filtered and the filtrate evaporated down to provide 1.13 g. of the same product as Example 1, as a white solid M. 194–198°, which leaves a residue on burning.

(3) Addition of 12.0 g. of triphenylphosphonium methylenetriphenylphosphorane bromide to a suspension of 2.78 g. of cuprous bromide in 300 ml. of methylene dichloride is followed by refluxing the mixture with stirring for 19–20 hours. The reaction mixture is filtered and the light yellow-green filtrate is flash evaporated to dryness, giving the same product as Example 1, as crystals weighing 14.19 g. after drying and melting at 193.5–196°.

Examples 4–5 illustrate formation of a cupric salt, in accordance with the equation

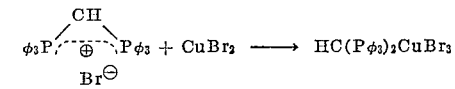

(4) A mixture of 0.75 g. of cupric dibromide and 100 ml. of methylene dichloride with 2.0 g. of triphenylphosphonium methylenetriphenylphosphorane bromide is stirred for 3 hours. The reaction mixture is then filtered and the green filtrate is evaporated down, to provide purple solid product which melts at 175–176° and weighs 1.98 g.

(5) A suspension is prepared of 0.36 g. of cupric bromide in 25 ml. of methylene dichloride and 1.0 g. of triphenylphosphonium methylenetriphenylphosphorane bromide is added. The mixture is refluxed for about 20 hours and then filtered. The filtrate is evaporated down to provide 0.83 g. of a dark purple voluminous precipitate which leaves a residue on combustion and melts at 175–180°. After recrystallization from a methylene dichloride/ethyl acetate mixture, triphenylphosphonium methylenetriphenylphosphorane copper tribromide is recovered as a grey solid, M. 195–197°.

Examples 6–9 illustrate formation of a cobalt salt, in accordance with the equation

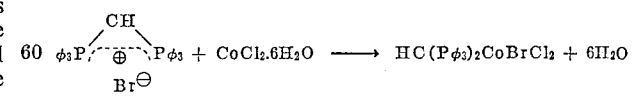

(6) 2.0 g. (3.34 millimoles) of triphenylphosphonium methylenetriphenylphosphorane bromide is added to a stirred suspension of 0.40 g. (1.67 millimoles) of cobalt dichloride hexahydrate. The solution immediately turns light blue. Refluxing and stirring for 1 hour provides a suspension which is filtered. Evaporation of the light blue filtrate provides triphenylphosphonium methylenetriphenylphosphorane cobalt bromide dichloride as medium blue crystals weighing 2.13 g. and melting at 227.5–229°. This product has the infrared spectrum absorption characteristic of a triphenylphosphonium methylenetriphenylphosphorane salt (absorption at 1027, 1010 and 988 cm.$^{-1}$). It is insoluble in cold water, hexane, cold isopropanol and n-butanol, and is soluble in methylene dichloride, cold ethanol, and hot propanol, isopropanol, and n-butanol.

(7) A suspension of 0.80 g. (3.34 millimoles) of cobalt dichloride hexahydrate in 100 ml. of methylene dichloride is stirred while 4.0 g. (6.68 millimoles) of triphenylphosphonium methylenetriphenylphosphorane bromide is added. The mixture is stirred at reflux temperature for 1 hour, after which magnesium sulfate is added to take up the aqueous red droplets. Filtration to remove solids provides a light blue filtrate which is flash evaporated to give 4.09 g. of the same product as Example 6, as voluminous light blue crystals, M. 228–229.5° (85% yield).

(8) To 0.38 g. of cobalt dichloride hexahydrate suspended in 25 ml. of methylene dichloride is added 1.0 g. of triphenylphosphonium methylenetriphenylphosphorane bromide, and the mixture is refluxed for 1 hour, then filtered, dried with magnesium sulfate, and evaporated to dryness to provide 0.98 g. of the cobalt compound as light blue voluminous crystals, M. 227–235°.

(9) A mixture of 5.7 g. of ground cobalt dichloride hexahydrate, 350 ml. of methylene dichloride, and 15.0 g. of triphenylphosphonium methylenetriphenylphosphorane bromide is refluxed with stirring for an hour. The reaction mixture is filtered, the filtrate is dried with magnesium sulfate, and the dried filtrate evaporated to dryness to provide the cobalt compound as voluminous blue crystals weighing 13.60 g. and melting at 227–235°. After three recrystallizations from a methylene dichloride/ethyl acetate mixture and drying at the reflux temperature of methanol at 0.1 mm. for 6 hours, it melts at 248–249.5° (corr.).

Examples 10–12 illustrate formation of a zinc salt, in accordance with the equation

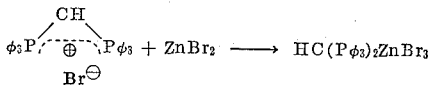

(10) To a suspension of 0.36 g. of zinc bromide in 25 ml. of methylene dichloride is added 1.0 g. of triphenylphosphonium methylenetriphenylphosphorane bromide. The mixture is refluxed for 4 and ½ hours, providing a cloudy white solution. The white solid is filtered off and the filtrate dried with magnesium sulfate, after which it is evaporated down to provide triphenylphosphonium methylenetriphenylphosphorane zinc tribromide as a white solid having an infrared spectrum similar to that of triphenylphosphonium methylenetriphenylphosphorane bromide, weighing 0.98 g. and melting at 258–261°.

(11) With all operations conducted in a dry box, 0.36 g. of zinc dibromide is added to 1.0 g. of triphenylphosphonium methylenetriphenylphosphorane bromide in 25 ml. of methylene dichloride. The mixture is refluxed for 25 hours and let stand at room temperature for about 2 days, then filtered and the filtrate evaporated down to provide 1.01 g. of the zinc compound as white solid, M. 259–260° after recrystallization from methylene dichloride/ethyl acetate. The product has the same infrared spectrum as the product of the above-described preparation.

(12) 4.37 g. of anhydrous zinc dibromide is added in a dry box to 300 ml. of methylene dichloride, and then 12.0 g. of triphenylphosphonium methylenetriphenylphosphorane bromide is introduced while the mixture is stirred. The reaction mixture is refluxed for 18 hours and then cooled and filtered. The filtrate is dried with magnesium sulfate, and the resulting clear solution is evaporated to dryness to provide 13.8 g. of white crystals which, after drying for 6 hours at 0.1 mm., melt at 258.5 – 259.5°. Mixture with triphenylphosphonium methylenetriphenylphosphorane bromide, which melts at 262.5–264.5°, produces depression of the melting point, to 226–238°. Analysis corroborates the assigned structrue:

Calc'd for $C_{37}H_{31}P_2ZnBr_3$: C, 52.84%; H, 3.72%; P, 7.37%; Zn 7.77%; Br, 28.27%. Found: C, 53.06%; H, 3.74%; P, 7.48%; Zn, 7.77%; Br, 28.70%.

Example 13 illustrates formation of a palladium salt, in accordance with the equation

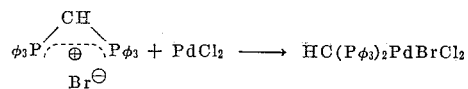

A mixture o palladium dichloride and triphenylphosphonium methylenetriphenylphosphorane bromide in methylene dichloride is stirred at room temperature and filtered. The orange-brown filtrate of the reaction mixture is evaporated down to provide the palladium salt, M. 253–260°.

Examples 14–16 illustrate the formation of iron salts, in accordance with the equation

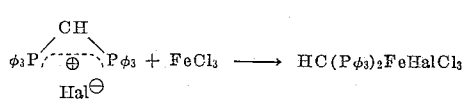

where Hal is halogen (iodine, bromide).

(14) To a solution of triphenylphosphonium methylenetriphenylphosphorane iodide in methylene dichloride is added anhydrous ferric chloride in methylene dichloride. The solution immediately turns dark purple. It is evaporated to dryness to give triphenylphosphonium methylenetriphenylphosphorane iron trichloride iodide as a dark yellow solid which can be recrystallized from absolute ethanol, M. 165–175°.

(15) On rapid addition of 0.53 g. (3.27 millimoles) of anhydrous sublimed ferric chloride to 75 ml. of methylene dichloride, part but not all of the ferric chloride dissolves. On addition of 2.0 g. (3.24 millimoles) of triphenylphosphonium methylenetriphenylphosphorane bromide, a red color immediately appears. The mixture, protected from access of atmospheric moisture by a calcium sulfate tube, is stirred for 24 hours and then filtered to remove a little grey-white solid. The dark red filtrate is flashed down to provide 2.43 g. of red-brown solid, M. 220–226°. Recrystallization from absolute ethanol provides a product melting at 230–230.5° (corr.), which is dried at 100° and 0.1 mm. for 10 hours. Elemental analysis gives results corroborating the assigned structure of triphenylphosphonium methylene triphenylphosphorane iron bromide trichloride:

Calc'd for $C_{37}H_{31}P_2FeBrCl_3$: C, 56.99%; H, 4.01%; P, 7.95%; Fe, 7.16%; Cl, 13.64%; Br, 10.25%. Found: C, 57.23%; H, 4.34%; P, 8.12%; Fe, 6.60%; Cl, 13.89%; Br, 10.19%.

(16) In a nitrogen-filled dry box, 3.12 g. (0.0193 mole) of anhydrous ferric chloride is added to 400 ml. of methylene chloride, to provide a suspension to which is added 11.9 g. (0.0193 mole) of triphenylphosphonium methylenetriphenylphosphorane bromide. An orange precipitate forms. The mixture is stirred at room temperature for 18 hours, filtered and the filtrate evaporated down at reduced pressure to give a red-golden solid residue. After extraction with 25 ml. of absolute ethanol, the material is dried to yield 13.8 g. of the same product as Example 15: after recrystallization from ethanol, red-golden needles, m. 230–230.5°.

*Examples 17–19*

These examples illustrate the formation of metal-containing mesomeric phosphorus compounds from the elemental metal.

Examples 17–18 illustrate the formation of metal-containing phosphorus compounds from a methylene bis-(phosphonium halide) in accordance with the equation

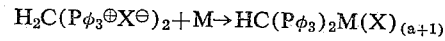

(17) A mixture of 2.0 g. of methylene bis(triphenylphosphonium bromide) and 0.50 g. of iron powder with 75 ml. of methylene dichloride is stirred at room temperature for 68 hours. The iron dissolves, to provide a yellow solution which is refluxed with stirring for 5 and ¾ hours and then stirred without heating for another 64 hours. The solid material in the reaction mixture is filtered off, and the dark orange filtrate flash-evaporated to provide golden-colored crystals. Extraction with absolute ethanol removes by-product triphenylphosphonium methylenetriphenylphosphorane bromide. The extracted solid, which has the infrared spectrum of a phosphonium methylenephosphorane salt, is recrystallized 3 times from ethanol and then dried at 100° and 0.1 mm. for 18 hours, to provide red-orange crystals with a corrected melting point of 224–225°. This is submitted for analysis, which corroborates the assigned structure, triphenylphosphonium methylenetriphenylphosphorane iron bromide dichloride:

Calc'd for $C_{37}H_{31}P_2FeCl_2Br_2$: C, 53.77%; H, 3.78%; P, 7.50%; Fe, 6.76%; Br, 19.34%; Cl, 8.58%. Found: C, 53.82%; H, 3.95%; P, 7.63%; Fe, 6.13%; Br, 20.84%; Cl, 7.13%;

(18) A mixture of 1.0 g. of methylene bis(triphenylphosphonium bromide) and 0.5 g. of metallic zinc in 50 ml. of methylene dichloride is stirred in a stoppered flask at room temperature for 2–3 days. The metal gradually goes into solution, producing a clear liquid reaction mixture. Flash evaporation to remove the solvent leaves white crystals. The product, M. 235–240°, is a triphenylphosphonium methylenetriphenylphosphonium zinc trihalide. It leaves a residue on combustion, and has an infrared spectrum characteristic of a metal-containing phosphonium methylenephosphorane complex halide.

Example 19 illustrates the formation of a metal-containing phosphorus compound from triphenylphosphine, a halomethane and an elemental metal in accordance with the equation.

$$\phi_3P + CH_2Cl_2 + Fe \rightarrow HC(P\phi_3)_2FeCl_4$$

85 g. (1.0 mole) of methylene dichloride and 262 g. (1.0 mole) of triphenylphosphine are placed in a 500 ml. No. 316 stainless steel bomb, which is rotated for 6 hours at 160° and then cooled overnight. The reaction mixture is now a viscous green tar, which is extracted first with 850 ml. of hot methanol, next with 200 ml. of ethyl ether, and finally the residual material in the bomb is dissolved in 350 ml. of hot methylene chloride.

The methanol extract is a dark green solution from which red crystals separate on cooling. These red crystals are filtered off.

The methylene chloride extract is a dark green solution, which is flash evaporated to provide a green tar. The tar is dissolved in 250 ml. of methanol. The mixture of green solid and red crystals which separates from this methanol solution is filtered off, and these solids are extracted, in 5 to 10 gram portions, with 50 ml. methanol portions, which dissolves out the green material, leaving red crystals.

The red crystals so obtained from the methylene chloride extract are combined with the red crystals separated by filtration from the first, methanol extract of the reaction mixture, to provide a total of 52 g. of product as red crystals, M. 227–230°. This red crystalline product on slow recrystallization from methanol gives large red crystals and on fast recrystallization gives small fluffy gold needles. When the red crystals are ground they acquire a golden color and both red and yellow have the same melting point, 229.5–231° C. Five g. of this product recrystallized from 450 ml. of methanol melts at 229.5–230.5° and has an elemental analysis corroborating the assigned structure, triphenylphosphonium methylenetriphenylphosphorane iron tetrachloride:

Calc'd for $C_{37}H_{31}P_2FeCl_4$: C, 60.44%; H, 4.25%; P, 8.4%; Fe, 6.92%; Cl, 19.29%. Found: C, 60.85%; H, 4.56%; P, 8.27%; Fe, 7.06%; Cl, 19.10%.

*Examples 20–22*

These examples illustrate formation of phosphonium addition compounds with halogen in accordance with the equations

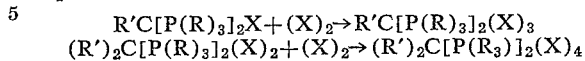

Examples 20–21 illustrate formation of a mesomeric phosphonium methylene phosphorane trihalide, in accordance with the equation

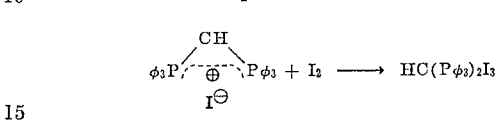

(20) A solution of 0.765 g. of iodine in 75 ml. of chloroform is stirred while 4.0 g. of triphenylphosphonium methylenetriphenylphosphorane iodide dissolved in 25 ml. of chloroform is added dropwise at room temperature. After 5 minutes, the solution is filtered and the filtrate evaporated down to provide 5.49 g. of solid. After extraction with 25 ml. of hot methanol, the product weighs 2.98 g. After 3 recrystallizations from methanol, the product melts at 199–199.5° (corr.) and analyzes correctly for the assigned structure, triphenylphosphonium methylenetriphenylphosphorane triiodide:

Calc'd for $C_{37}H_{31}P_2I_3$: C, 48.39%; H, 3.40%; P, 6.73%; I, 41.46%. Found: C, 48.47; H, 3.56%; P, 7.01%; I, 41.38%.

(21) To prepare methylene bis(triphenylphosphonium bromide), 696 g. (4.0 moles) of methylene bromide is held under nitrogen while 526 g. (2.0 moles) of triphenylphosphine is introduced over a 10 minute period. The clear yellow-orange solution is refluxed for two hours. The reaction mixture is cooled to room temperature and 900 ml. of anhydrous ether added. This produces a buff solid, which is separated by filtration and dissolved in 500 ml. of warm ethanol. This solution is filtered and to the filtrate is added 2 liters of ethyl acetate, dropwise, over two hours, with stirring. The light yellow salt which separates is filtered off, redissolved in 500 ml. of ethanol and again precipitated with 2 liters of ethyl acetate. This produces white fluffy crystals which are dried at reduced pressure and 80° to give 193.9 of methylene bis(triphenylphosphonium bromide), M. 295–296°. Recrystallization from ethanol raises the melting point to 310–310.5°.

To provide triphenylphosphonium methylenetriphenylphosphorane bromide, 70.0 g. (0.1 mole) of methylene bis(triphenylphosphonium bromide) is added to 60 g. (0.57 mole) of anhydrous sodium carbonate dissolved in 500 ml. of distilled water. The mixture is refluxed for four hours and then cooled to room temperature. The reaction mixture is filtered to separate 60.6 g. of buff solid, M. 260–269° after drying at 20 mm./80°. The solid product is dissolved in 150 ml. of methylene chloride, filtered and reprecipitated by addition of 200 ml. of hexane. After filtration and drying overnight at 0.1 mm. at room temperature, the triphenylphosphonium methylenetriphenylphosphorane bromide is obtained as white crystals, weighing 40.0 g. and melting at 274–275°.

To convert the bromide salt into the iodide, 3.0 g. (4.87 millimoles) of triphenylphosphonium methylenetriphenylphosphorane bromide is added to a solution of 8.5 g. (0.0512 mole) of potassium iodide in 125 ml. of absolute ethanol. The resulting mixture is refluxed for 2 hours and then cooled to room temperature, 2.5 liters of water is added and the resulting white precipitate is filtered off (in the dark). After drying at 0.5 mm. for 20 hours in the dark, the product obtained weighs 3.1 g. and is light yellow in color, melting at 252–254°. The compound shows a positive Beilstein test (for halogen) and a depressed melting point with starting material. The infrared spectrum is similar to but not identical with that of the starting material. On recrystallization from a mixture of methylene chloride and hexane, the iodide is obtained as light yellow crystals, M. 253–254°.

To provide the triiodide, a solution of 12.0 g. (0.0181 mole) of triphenylphosphonium methylenetriphenylphosphorane iodide in 150 ml. of chloroform is added dropwise to a stirred solution of 4.59 g. (0.0181 mole) of iodine in 450 ml. of chloroform, over a 12 minute period. During this addition, the color of the reaction mixture changes from purple to dark brown. After stirring for 30 minutes more, the reaction mixture is evaporated down under reduced pressure to provide 15.39 g. of brown solid residue. This solid product is extracted with 500 ml. of hot methanol, leaving 12.87 g. of the triiodide which is isolated as brown needles, M. 199–199.5°, after recrystallization from methanol.

Example 22 illustrates formation of a methylene diphosphonium tetrahalide, in accordance with the equation $$H_2C[P\phi_3^{\oplus}Br^{\ominus}]_2 + I_2 \rightarrow H_2C(P\phi_3)Br_2I_2$$

Methylene bis(triphenylphosphonium bromide) is mixed with an equimolar amount of iodine in chloroform and the solvent is evaporated off to provide a residue comprising methylene bis(triphenylphosphonium) dibromide diiodide.

*Examples 23–32*

These examples illustrate formation of metal-containing methylene diphosphonium compounds in accordance with the equation $$(R')_2C[P(R)_3^{\oplus}X^{\ominus}]_2 + M(X)_a \rightarrow$$
$$(R')_2C[P(R)_3]_2M(X)_{(a+2)}$$

Examples 23–24 illustrate formation of a cuprous salt, in accordance with the equation

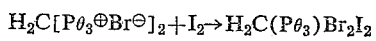

$$\phi_3P\text{—}CH_2\text{—}P\phi_3 + CuBr \longrightarrow CH_2(P\phi_3)_2CuBr_3$$
$$\overset{\oplus}{\phantom{x}} \quad \overset{\oplus}{\phantom{x}}$$
$$Br^{\ominus} \quad Br^{\ominus}$$

(23) 1.0 g. of methylene bis(triphenylphosphonium bromide) is added to 0.20 g. of cuprous bromide in 50 ml. of methylene dichloride. The mixture is stirred and refluxed for 24 hours. It is then cooled to room temperature, and the solid precipitate in the reaction mixture is filtered off and dried, to provide 0.92 g. of methylene bis(triphenylphosphonium) copper tribromide, M. 257–270°.

(24) 2.0 g. of methylene bis(triphenylphosphonium bromide) is added to 0.41 g. of cuprous bromide in 100 ml. of dry methylene chloride. The reaction mixture is stirred at room temperature (about 25°) for a half hour, and then refluxed for three-quarters of an hour. The solid precipitate in the reaction mixture is filtered off, added to 100 ml. of methylene chloride and the mixture refluxed for 2 hours. It is then cooled and filtered and the filtrate evaporated down to provide the methylene bis(triphenylphosphonium) copper tribromide as a light violet solid weighing 0.95 g. and melting at 265–275°.

Example 25 illustrates formation of a cupric salt in accordance with the equation

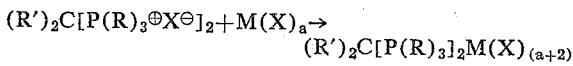

$$\phi_3P\text{—}CH_2\text{—}P\phi_3 + CuBr_2 \longrightarrow CH_2(P\phi_3)_2CuBr_4$$
$$\overset{\oplus}{\phantom{x}} \quad \overset{\oplus}{\phantom{x}}$$
$$Br^{\ominus} \quad Br^{\ominus}$$

(25) 1.0 g. of methylene bis(triphenylphosphonium bromide) is added to 0.32 g. of cupric bromide in 50 ml. of methylene dichloride and the reaction mixture is refluxed for 24 hours. After cooling, it is filtered to isolate solid product which, after extraction with methanol, is a purple solid, M. 241–245°. A mixed melting point with a dark solid isolated by filtration from the reaction mixture of cupric bromide and triphenylphosphonium methylenetriphenylphosphorane bromide in methylene dichloride, prior to evaporation of the filtrate to recover the mesomeric phosphorus salt product of that reaction, described in Example 5, indicates their identity. The product is methylene bis(triphenylphosphonium) copper tetrabromide.

Examples 26–28 illustrate formation of a cobalt salt, in accordance with the equation

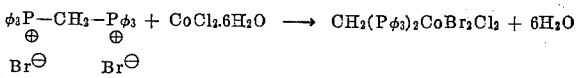

$$\phi_3P\text{—}CH_2\text{—}P\phi_3 + CoCl_2 \cdot 6H_2O \longrightarrow CH_2(P\phi_3)_2CoBr_2Cl_2 + 6H_2O$$
$$\overset{\oplus}{\phantom{x}} \quad \overset{\oplus}{\phantom{x}}$$
$$Br^{\ominus} \quad Br^{\ominus}$$

(26) 1.0 g. of methylene bis(triphenylphosphonium bromide) is added to 0.34 g. of cobalt dichloride hexahydrate in 25 ml. of methylene dichloride, the mixture is refluxed for an hour, 25 more ml. of methylene dichloride is added, and the mixture refluxed for another half hour. The light blue solids in the reaction mixture are recovered by filtration to provide 0.29 g. of methylene bis(triphenylphosphonium) cobalt dibromide dichloride, M. 265–290°.

(27) A mixture of 0.34 g. of cobalt dichloride hexahydrate, 1.0 g. of methylene bis(triphenylphosphonium bromide) and 50 ml. of methylene dichloride is refluxed and stirred for 17 hours. The reaction mixture is then filtered, with the aqueous phase being taken up with filter paper, to isolate the cobalt compound as blue solid weighing 1.05 g. After extraction with ethanol at room temperature, the product melts at 296–297.5° C.

(28) A mixture of 5.10 g. of cobalt dichloride hexahydrate and 15.0 g. of methylene bis(triphenylphosphonium bromide) in 750 ml. of methylene chloride is refluxed for 24 hours. The aqueous layer in the reaction mixture is removed in a separatory funnel, and then the reaction product is filtered to isolate 14.79 g. of the cobalt compound. After two extractions with absolute ethanol, the corrected melting point is 305.5–306.5°.

Examples 29–32 illustrate formation of a ferric salt, in accordance with the equation

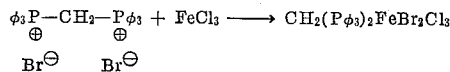

$$\phi_3P\text{—}CH_2\text{—}P\phi_3 + FeCl_3 \longrightarrow CH_2(P\phi_3)_2FeBr_2Cl_3$$
$$\overset{\oplus}{\phantom{x}} \quad \overset{\oplus}{\phantom{x}}$$
$$Br^{\ominus} \quad Br^{\ominus}$$

(29) Methylene bis(triphenylphosphonium bromide) and ferric chloride are mixed in methylene dichloride. When the mixture is stirred, a golden precipitate forms. This is filtered off and recrystallized from ethanol, providing methylene bis(triphenylphosphonium) iron dibromide trichloride as golden crystals, M. 205–212°. The infrared spectrum is like that of methylene bis(triphenylphosphonium bromide), with an absorption band at 1228 cm.$^{-1}$, indicating complex formation.

(30) Addition of 3.0 g. of methylene bis(triphenylphosphonium bromide) (0.0043 mole) to 0.70 g. of ferric chloride (0.0043 mole) in 75 ml. of methylene dichloride produces an immediate golden precipitate. The mixture is stirred and refluxed for 1 hour and then the golden needles are filtered off and dried under vacuum at 70°, providing 3.55 g. of the iron compound, M. 204–208°, having an infrared spectrum identical with that of the above-described product.

(31) When 3.0 g. of methylene bis(triphenylphosphonium bromide) is added to 1.4 g. of ferric chloride in 75 ml. of methylene dichloride and the mixture stirred and refluxed, the solid appearing in the reaction mixture is colored red-brown. Filtration of the reaction mixture provides 4.19 g. of red-brown crystals, M. 267–269°. After a single recrystallization from 225 ml. of ethanol, the product has a melting point of 198–200° C., and is the product of the 1:1 molar ratio described above.

(32) 12.40 g. (0.017 mole) of methylene bis(triphenylphosphonium bromide) is added to a stirred suspension of 2.82 g. (0.017 mole) of anhydrous ferric chloride in 300 ml. of methylene chloride. The mixture is refluxed with stirring for 1.75 hours, and the resulting red-golden needles are filtered off and dried under vacuum at 80° for 2 hours. The dried ferric chloride complex is then extracted with 50 ml. of absolute ethanol and redried, and finally recrystallized from absolute ethanol. The product melts at 211.5–212° C. Elemental analysis corroborates the assigned structure:

Calc'd for $C_{37}H_{32}Br_2Cl_3FeP_2$: C, 51.63%; H, 3.75%; P, 7.20%; Fe, 6.49%; Br, 18.57%; Cl, 12.36%. Found: C, 51.26%; H, 4.18%; P, 7.12%; Fe, 6.06%; Br, 18.87%; Cl, 11.89%.

*Example 33*

This example describes utilization of compounds of the invention as toxicants.

To test bactericidal and fungicidal activity, inoculations of *S. aureus*, *S. typhosa* and *A. niger* are made on agar substrates supporting the growth of these organisms, to which have been added varying amounts of triphenylphosphonium methylenetriphenylphosphorane triiodide. The inoculated plates are maintained under conditions supporting growth of these microorganisms. At a 1 part per 1000 concentration in the agar, the triiodide suppresses growth of each of the organisms. At concentrations down to 1 part per 100,000, it suppresses the growth of the two Staphylococcus organisms.

To test defoliant activity, Black Valentine bean plants, 4 to a pot, are grown to the stage of having 1 mature trifoliate and 1 partially opened trifoliate, and then sprayed with the stated triiodide salt as an aqueous emulsion, at rates of 0.1 to 1.0 pound per acre (lbs./acre), using a dilution of 30 gallons/acre, after which the plants are maintained in a greenhouse within temperature limits of 70–90° F. The plants are over 75% defoliated in 14 days at both rates, and at the higher rate, 70% abscission is observed after only 6 days. Defoliation in the 26–50% range is observed when the same trihalide and when methylene bis(triphenylphosphonium) cobalt dibromide dichloride are applied to soybean plants at the rate of 10 lbs./acre.

In herbicidal activity tests, 6 ml. of an 0.5% aqueous emulsion of the methylene bis(triphenylphosphonium) cobalt dibromide dichloride compound is applied as a spray to 2-week-old plants, at a rate equal to about 9 lbs./acre. After 14 days in a green house, the plants are observed for phytotoxic action of the chemical. It is found that the metal compound produces severe injury or kill of brome grass (giant) foxtail, crabgrass and pigweed.

In agricultural fungicide tests, 4 week old Bonny Best tomato plants and domestic apple seedlings of about ⅜₁₆ inch diameter are sprayed with aqueous emulsions containing predetermined concentrations of, respectively, (1) Triphenylphosphonium methylenetriphenylphosphorane triiodide,
(2) Triphenylphosphonium methylenetriphenylphosphorane iron bromide trichloride at a rate of 5 ml. of solution per plant. Twenty four hours later, inoculum in the form of zoospores of *Phytophthora infestans* (tomato blight) is sprayed on the tomato plants and conidia of *Venturia inaequalis* (apple scab) is sprayed on the apple seedlings. The plants are then incubated for 48 hours in a constant temperature-humidity chamber, and then in a greenhouse for 7 (tomato) and 14 (apple) days. The extent of disease recorded is either none or very slight at concentrations of 1000 p.p.m. application rates for each chemical. The iron salt protects the apple seedling from the scab disease at still lower concentrations, and is as good as a commercial reference fungicide in this connection.

In insecticidal screening, activity for control of mosquito larvae is demonstrated as follows. Triphenylphosphonium methylenetriphenylphosphorane triiodide and methylene bis(triphenylphosphonium) cobalt dibromide dichloride are each, individually, mixed with 50 ml. of water and 0.5 ml. of acetone to provide 10 p.p.m. concentrations of the phosphorus compounds in the liquids. Some 20 early fourth instar yellow fever mosquito larvae (*Aedes aegypti*) are placed in the containers holding the solutions of the phosphorus compounds and held there at room temperature for 24 hours. The cobalt compound produces a 50 percent mortality of the larvae, and the triiodide, an 80% mortality. When 0.1 ml. of a mixture of 3 standard insecticides (of the chlorinated hydrocarbon, carbamate and organic phosphorus type, respectively) in acetone, which in itself would produce about a 5% mortality rate in the larvae, is now added to the partially killed larvae in the solutions, 100% mortality has occurred within another 24 hours in the mixture containing the triiodide, and 80% in that containing the cobalt compound. In a further test, 20 larvae are added to 50 ml. of an aqueous solution containing 1 p.p.m. of the triiodide compound and 0.5 ml. of the above-described insecticide mixture, which produces only 0–10% mortality alone. The solution with the triiodide present produces a 40% kill of the larvae.

The present phosphonium halide compounds are generally applied for pesticidal and toxicant use in the form of sprays or aerosols. Useful sprays may be prepared by dispersing the present products in water with the aid of a wetting agent, to prepare aqueous dispersions which may be employed by as sprays. For example, a cyclohexanone solution of a polyalkylene glycol ether long chain alkyl benzene sulfonate emulsifier may be used to prepare such dispersions or emulsions. The products may also be applied to pest hosts as oil-in-water emulsion sprays. The present products may also be dissolved in liquefied gases such as fluorochloroethanes or methyl chloride and applied to plants or other pest organism hosts from aerosol bombs. Instead of employing liquids as carriers and diluents, pesticidal dusts which contain the present novel phosphonium halide compounds as active ingredients may be prepared, for example, by incorporating the active phosphonium halide compound with a solid carrier such as talc, bentonite, fuller's earth, and so forth.

*Example 34*

This example relates to utilization of the presently provided metallic compounds as polymerization catalysts.

Samples of styrene monomer containing a polymerization inhibitor are respectively mixed with (1) triphenylphosphonium methylenetriphenylphosphorane iron bromide trichloride and (2) triphenylphosphonium methylenetriphenylphosphorane copper dibromide. A similar sample of the styrene monomer is reserved, without any phosphorus salt additive, and the three samples are let stand at room temperature for a week. At the end of this time, it is found that the inhibited styrene samples containing the metallic salts have polymerized, while the sample without any phosphorus additive remains unpolymerized and fluid.

While the invention has been illustrated with reference to various specific preferred embodiments thereof, it is to be appreciated that modifications and variations are possible within the scope of the invention, which is limited only as defined in the appended claims.

What is claimed is:

1. A methylene phosphonium halide compound selected from the class consisting of phosphonium methylene phosphorane trihalides of the formula $R'C[P(R)_3]_2(X)_3$, methylene diphosphonium tetrahalides of the formula $(R')_2C[P(R)_3]_2(X)_4$, phosphonium methylene phosphorane metal halides of the formula $$R'C[P(R)_3]_2M(X)_{(a+1)}$$

and methylene diphosphonium metal halides of the formula $(R')_2C[P(R)_3]_2M(X)_{(a+2)}$ where each $R'$ is a radical selected from the class consisting of hydrogen and hydrocarbon radicals, each $R$ is a hydrocarbon radical, each $X$ is a halogen atom, each $M$ is a metal which forms halides having bonds of predominantly covalent character, and $a$ is the valence of $M$, wherein each said hydrocarbon radical is free of aliphatic unsaturation and contains up to 18 carbon atoms.

2. The phosphonium methylene phosphorane trihalides of the formula $HC[P(R)_3]_2(X)_3$ where each R is a hydrocarbon radical free of aliphatic unsaturation and containing up to 18 carbon atoms and each X is a halogen atom.

3. Triphenylphosphonium methylenetriphenylphosphorane trihalides.

4. Triphenylphosphonium methylenetriphenylphosphorane triiodide.

5. The methylene diphosphonium tetrahalides of the formula $H_2C[P(R)_3]_2(X)_4$ where each R is a hydrocarbon radical free of aliphatic unsaturation and containing up to 18 C atoms and each X is a halogen atom.

6. Methylene bis(triphenylphosphonium) dibromide diiodide.

7. The phosphonium methylene phosphorane metal halides of the formula $HC[P(R)_3]_2M(X)_{(a+1)}$ where R is a hydrocarbon radical free of aliphatic unsaturation and containing up to 18 carbon atoms, M is a metal which forms halides having bonds of predominantly covalent character, X is a halogen atom and $a$ is the valence of M.

8. Triphenylphosphonium methylenetriphenylphosphorane metal polyhalides.

9. Triphenylphosphonium methylenetriphenylphosphorane iron tetrahalides.

10. Triphenylphosphonium methylenetriphenylphosphorane iron bromide trichloride.

11. Triphenylphosphonium methylenetriphenylphosphorane zinc trihalides.

12. Triphenylphosphonium methylenetriphenylphosphorane zinc tribromide.

13. Methylene diphosphonium metal halides of the formula $H_2C[P(R)_3]_2M(X)_{(a+2)}$ wherein each R is a hydrocarbon radical free of aliphatic unsaturation and containing up to 18 carbon atoms, M is a metal which forms halides having bonds of predominantly covalent character, each X is a halogen atom, and $a$ is the valence of M.

14. Methylene bis(triphenylphosphonium) metal polyhalides.

15. Methylene bis(triphenylphosphonium) iron pentahalides.

16. Methylene bis(triphenylphosphonium) iron dibromide trichloride.

17. Methods of forming a phosphonium methylene phosphorane metal halide, selected from the group consisting of
   (1) contacting a metal halide with a phosphonium methylene phosphorane halide in an organic solvent;
   (2) contacting an elemental metal with a methylene bis(phosphonium halide) in an organic solvent; and
   (3) contacting an elemental metal with a tri-hydrocarbylphosphine and a hydrocarbyl polyhalide; wherein each said metal is metal forming halides having bonds of predominantly covalent character.

18. Methods of forming a methylene phosphonium metal halide compound comprising contacting a metal halide having a bond of predominantly covalent character, in an organic solvent, with a methylene phosphonium halide selected from the group consisting of phosphonium methylene phosphorane halides and methylene bis(phosphonium halides).

19. Methods of forming a phosphonium methylene polyhalide compound comprising contacting a halogen in an organic solvent with a methylene phosphonium halide selected from the group consisting of phosphonium methylene phosphorane halides and methylene bis(phosphonium halides).

References Cited
UNITED STATES PATENTS

| | | | |
|---|---|---|---|
| 3,262,971 | 7/1966 | Matthews et al. | 260—606.5 |
| 3,032,573 | 5/1962 | Meriwether et al. | 260—439 |
| 3,094,405 | 6/1963 | Toy et al. | 71—2.3 |
| 3,102,899 | 9/1963 | Cannell | 260—439 |
| 3,109,770 | 11/1963 | Price et al. | 167—22 |
| 3,116,139 | 12/1963 | Fust et al. | 71—2.3 |
| 3,116,201 | 12/1963 | Whetstone et al. | 167—22 |

TOBIAS E. LEVOW, *Primary Examiner.*

HELEN M. McCARTHY, *Examiner.*

E. C. BARTLETT, H. M. S. SNEED,
*Assistant Examiners.*